United States Patent
Waynick et al.

(10) Patent No.: US 10,742,012 B2
(45) Date of Patent: Aug. 11, 2020

(54) SCREW LESS COVER PLATE FOR ELECTRICAL FIXTURES

(71) Applicants: Dovelyn J Waynick, Rockwall, TX (US); Max Probasco, Plano, TX (US)

(72) Inventors: Dovelyn J Waynick, Rockwall, TX (US); Max Probasco, Plano, TX (US)

(73) Assignee: DJW Push, INC, Rockwall, TX (US)

( * ) Notice: Subject to any disclaimer, the term of this patent is extended or adjusted under 35 U.S.C. 154(b) by 0 days.

(21) Appl. No.: 16/571,746

(22) Filed: Sep. 16, 2019

(65) Prior Publication Data

US 2020/0059076 A1 Feb. 20, 2020

Related U.S. Application Data

(60) Provisional application No. 62/848,990, filed on May 16, 2019.

(51) Int. Cl.
*H02G 3/14* (2006.01)

(52) U.S. Cl.
CPC .................... *H02G 3/14* (2013.01)

(58) Field of Classification Search
CPC ............ H02G 3/14; H02G 3/08; H02G 3/081; H01H 9/02; H01H 9/904; H01H 9/04; H01R 13/52; H01R 13/5213; H01R 13/46
USPC ............................. 174/66, 67; 220/241, 242
See application file for complete search history.

(56) References Cited

U.S. PATENT DOCUMENTS

| | | | | |
|---|---|---|---|---|
| 2,492,115 A | * | 12/1949 | Crowther | F16B 21/16 174/66 |
| 2,934,590 A | * | 4/1960 | Thompson | H02B 1/048 174/66 |
| 3,619,477 A | * | 11/1971 | Rasmussen | H02G 3/14 174/56 |
| 4,534,486 A | * | 8/1985 | Eidson | H02G 3/14 174/66 |
| 4,835,343 A | * | 5/1989 | Graef | H02G 3/14 174/66 |
| 7,030,319 B2 | * | 4/2006 | Johnsen | H02G 3/14 174/66 |
| 8,148,637 B2 | * | 4/2012 | Davidson | H02G 3/14 174/66 |
| 8,212,146 B1 | * | 7/2012 | Moore | H01R 13/447 174/66 |

* cited by examiner

*Primary Examiner* — Angel R Estrada
(74) *Attorney, Agent, or Firm* — Barry Choobin; Patent 360

(57) ABSTRACT

A screw less, adjustable cover plate for electrical fixtures is disclosed. The cover plate has a rear side which comprises of a prong attached thereto or molded as an integral part of the cover plate. The prong extends rearward from the cover plate and is orthogonal to a face of the cover plate. The prong is positioned in such a manner that it aligns with a threaded hole in the electrical outlet conventionally used to receive a screw for fastening the cover plate to the outlet. In an embodiment, the prong is configured to be pushed and not threaded into the threaded hole, in order to secure the cover plate to the electrical outlet. In this manner, the cover plate can be quickly installed without any tools and screws.

6 Claims, 12 Drawing Sheets

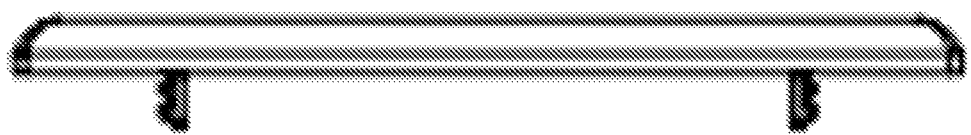
Fig. 7A
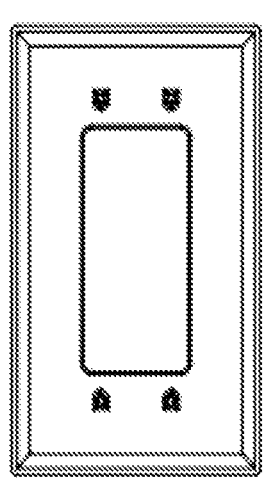
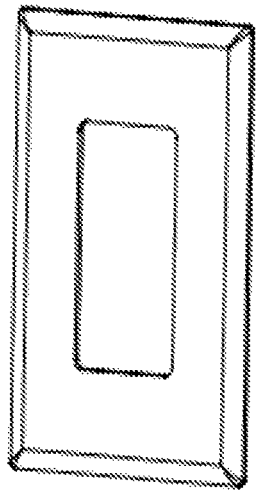
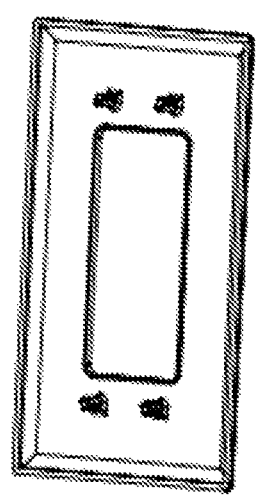
Fig. 7B	Fig. 7C	Fig. 7D

SCREW LESS COVER PLATE FOR ELECTRICAL FIXTURES

TECHNICAL FIELD OF THE INVENTION

The technology described herein relates generally to electrical wiring components, electrical devices, receptacle boxes, cover plates, and cover plate assemblies. More specifically, this technology relates to a screw less cover plate for electrical device fixtures.

BACKGROUND OF THE INVENTION

The purpose of a cover plate is to provide a decorative cover for the receptacle box installation while also preventing operator exposure to the interior of the receptacle box, which in many instances contains electrical wiring. By way of example, a cover plate can cover a receptacle box containing devices such as ON/OFF switches, outlet receptacles, dimmers, motor speed selector switches, coaxial cable connectors, TV antenna connectors, telephone jacks, computer network cable connectors, informational devices such as clocks, thermometers, security systems, and so forth.

Known cover plates are typically constructed in the form of a generally flat plate having one or more openings to provide access to a wired device, or the like, mounted in the receptacle box. The existing prior art cover plates involves the use of screws and intervening devices for insertion of the cover plate in the electrical components attached to the electrical devices for secure and firm positioning of the cover plate with the electrical devices. But this leads to a lot of fixing issues and problems as the dimensions of the screws are not aligned with the cover plate dimensions so that the cover plate is tightly and safely secured with the electrical device by getting it inserted into the electrical component of the electrical device.

Hence, looking at the problems in the prior art cover plates, there is a need of a screw less cover plate for electrical device fixtures.

SUMMARY OF THE INVENTION

In various exemplary embodiments, the technology described herein provides a screw less cover plate to cover a receptacle box, such as, for example but not limited to any specific electrical device, an electrical receptacle box for an electrical outlet.

In various embodiments, a screw less cover plate for electrical device fixtures is disclosed. The cover plate assembly includes a screw less cover plate for an electrical receptacle box that is capable of being installed directly to an electrical device that is installed in the receptacle box. In various embodiments, the securing mechanism for the cover plate can be in the form of protrusions, prongs, or other structural members (hereinafter referred to generally as "prongs"), each integrally formed with the cover plate. The prongs integrally formed with the cover plate provide a means of attachment to any electrical device that is mounted into the receptacle box, including, but without limitation, an electrical outlet, light switch, oven plug, cable or phone connection, stereo, or any other electrical device.

In at least one embodiment, the screw less cover plate includes prongs used in place of screws disposed on the cover plate in a manner in which the cover plate is secured to the electrical device in a normal position by expanding back to the normal position to engage the screw hole to secure itself firmly in place.

In at least one embodiment, the screw less cover plate comprises of a plurality of prongs disposed on the cover plate in a manner in which the cover plate is secured to the electrical device in a center attachment area.

In at least one embodiment, the screw less cover plate includes prongs disposed on the cover plate in a manner in which the cover plate is secured to the electrical device in a side attachment area.

In at least one embodiment, screw less cover plate includes prongs disposed on the cover plate in a manner in which the cover plate is secured to the electrical device in a screw hole attachment area.

In at least one embodiment, the screw less cover plate includes prongs disposed on the wall plate in a manner in which the cover plate is secured to the electrical device in an attachment area going into two existing holes of the electrical device, one located above and one located below the electrical device.

As will be apparent to one of ordinary skill in the art, after reading the disclosure contained herein, there are numerous optional configurations of the locations of the prongs and the shape or size of the prongs which can provide further options to accommodate various devices.

In at least one embodiment, the screw less cover plate also comprises of a plurality of ridges, the location of which can vary according to the electrical device to which it is attached. Examples of such ridges are shown in the following figures labeled as reference numeral 16.

Advantageously, the screw less cover plate provides easy installation, without the use of tools, and sustained coverage of an electrical box without the need for or use of screws, including those used in known devices through holes in the cover plate or in a separate device that intervenes between the electrical box and the cover plate. The latter devices appear to be screw less on the face of the cover plate, but actually use screws on the intervening device to connect the intervening device to the electrical device. A rear side of the screw less cover plate has two prongs attached as an integral part of the cover plate. The prongs extend rearward from the cover plate and are orthogonal to a face of the cover plate. The prongs are positioned in such a manner that they align with threaded holes in the electrical switch conventionally used to receive screws for fastening the cover plate to the switch. The technology disclosed herein uses no such intervening device. Additionally, utilizing a cover plate without screws ensures that no mismatch between screws and the cover plate exists.

Further advantageously, the screw less cover plate provides a solution in which time, labor, and expenses are saved due to the ease of use and installation without screws and tools. Manufacturing and packaging costs are also lessened due to the elimination of the screws and elimination of any intervening devices. Use of the screw less cover plate also saves the environment with its use of fewer parts, less packaging, and the elimination of painting of the screws.

Further advantageously, the prongs of the cover plate provides a plurality of ribs along its outer edge wherein these ribs are bridged at the end of the prong for durability and strength while the center of the each prong has slit cutout in the form of a void which is designed in such a manner that prongs ribs disengages the screw hole while pressing on the cover plate or taking it off from any electrical device. However, once the cover plate is pushed onto the electrical device, the prong will expand back to its normal position to engage the screw hole to secure itself firmly in place.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of, and the shape and size of, the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

It is to be understood that both the foregoing general description and the following details description are exemplary and explanatory and are intended to provide further explanation of the invention as claimed.

BRIEF DESCRIPTION OF THE DRAWINGS

The technology described herein is illustrated with reference to the various drawings, in which like reference numbers denote like device components and/or method steps, respectively, and in which:

FIG. 1b shows the side face of the cover plate of FIG. 1a.

FIG. 1C is a rear perspective view of the cover plate of FIG. 1a.

FIG. 1D is a front perspective view of the cover plate of FIG. 1a.

FIG. 2B is a rear-perspective view of the switch cover plate of FIG. 2A

FIG. 7A illustrates a side view of cover plate

FIG. 7B is the rear view of the cover plate;

FIG. 7C is the front perspective view of the cover plate;

FIG. 7D is the rear perspective view of the cover plate;

DETAILED DESCRIPTION OF THE INVENTION

Figure 1A:
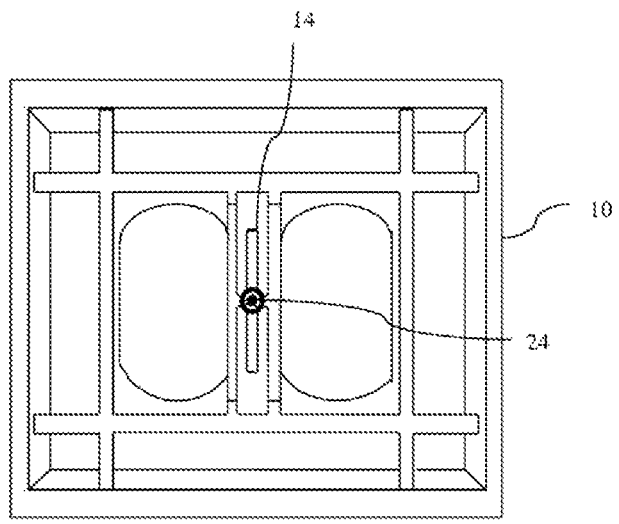
FIG. 1a illustrates the rear view of a cover plate in accordance to one or more embodiments of the invention.
Figure 1B:
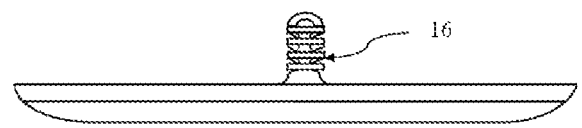
Figure 1C:
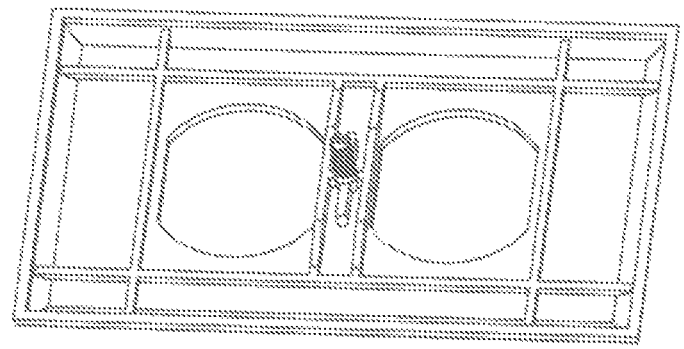
Figure 1D:
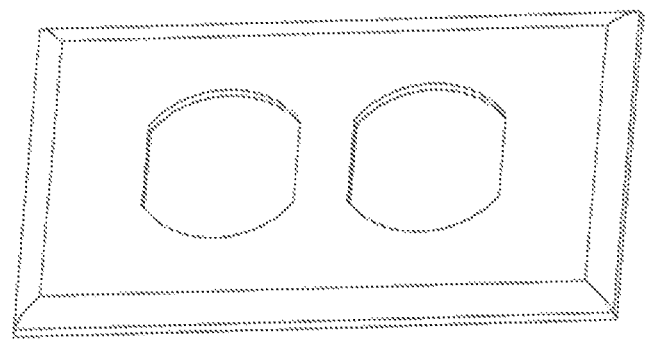

Before describing the disclosed embodiments of this technology in detail, it is to be understood that the technology is not limited in its application to the details of the particular arrangements shown here since the technology described is capable of other embodiments. Also, the terminology used herein is for the purpose of description and not of limitation.

In various exemplary embodiments, the technology described herein provides a one-piece screw less cover plate to attach any electrical device to cover a receptacle box, such as, for example but not limited to, an electrical receptacle box for an electrical outlet.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

Referring now to FIG. 1A-1D, a screw less cover plate 10 is shown in relation to an electrical outlet box 20. The cover plate 10 has openings 12 for access to an electrical outlet 22 secured in the box 20 in a conventional manner. Two openings for access to the electrical outlet 22 are shown in FIG. 1 but any number of openings may be provided in other examples (such as duplex, triplex or other combinations of openings for electrical outlets, switches, data ports, etc.). The cover plate 10 has a rear side which comprises of a prong 14 attached thereto or molded as an integral part of the cover plate 10. The prong 14 extends rearward from the cover plate 10 and is orthogonal to a face of the cover plate 10. The prong 14 is positioned in such a manner that it aligns with a threaded hole 24 in the electrical outlet 22 conventionally used to receive a screw for fastening a cover plate 10 to the outlet 22. In this example, the prong 14 is configured to be pushed and not threaded into the threaded hole 24, in order to secure the cover plate 10 to the electrical outlet 22. In this manner, the cover plate 10 can be quickly installed without any tools.

The prong 14 has a series of spaced apart external ridges 16 formed thereon for engaging the threaded hole 24. For ease of insertion in the threaded hole 24, an end of the prong 14 has a smaller diameter than an outer dimension of the ridges 16 (see FIG. 5). In this example, the ridges 16 all have a same outer dimension, but in other examples the outer dimensions of the ridges 16 could be different (such as tapered from the end to the cover plate 10). In addition, a slot is formed longitudinally through a substantial portion of the prong 14, so that two flexible sections of the prong 14 are formed. When the prong 14 is inserted into the threaded hole 24, the prong 14 sections can flex towards each other. After the cover plate 10 is installed, the flexibility of the prong 14 sections help to maintain the cover plate 10 in position on the electrical outlet box 20. In this example, the slot does not extend all the way through the end of the prong 14 (so that a "bridge" remains between the prong 14 sections on either side of the slot), but in other examples the slot could extend all the way through the end of the prong 14 (so that the prong 14 sections are separated at the end of the prong 14).

Figure 2A:
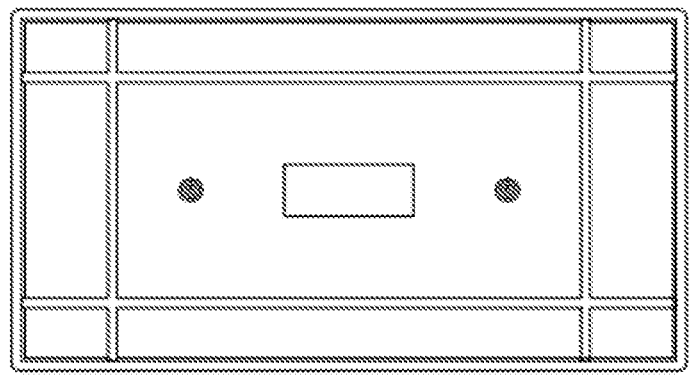
FIG. 2A illustrates an example of a rear side of a switch cover plate configured to cover an electrical box.
Figure 2B:
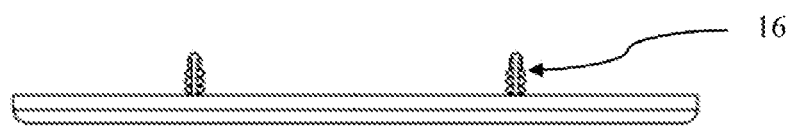
FIG. 2B is a side view of the switch cover plate of FIG. 2A.
Figure 2C:
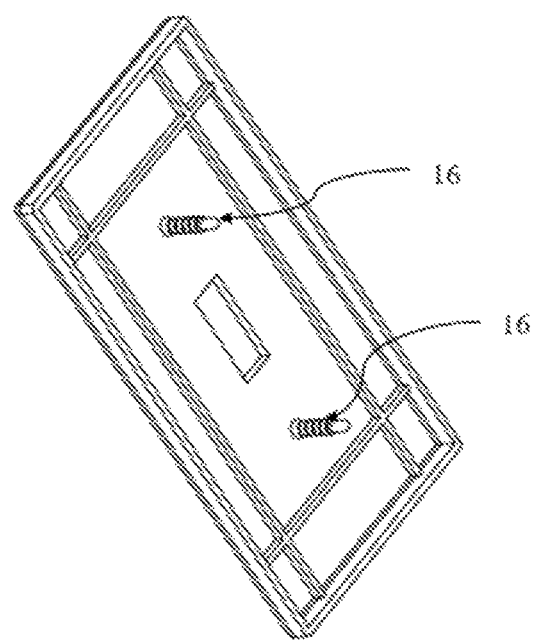
Figure 3A:
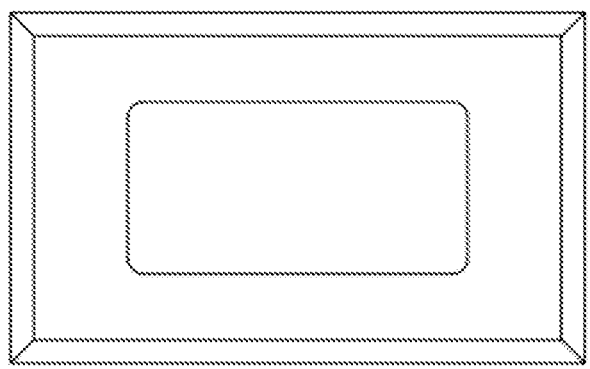
FIG. 3A illustrates another example of a switch cover plate, showing front view, which is in use for the type of a switch known as a "rocker" switch.
Figure 3B:
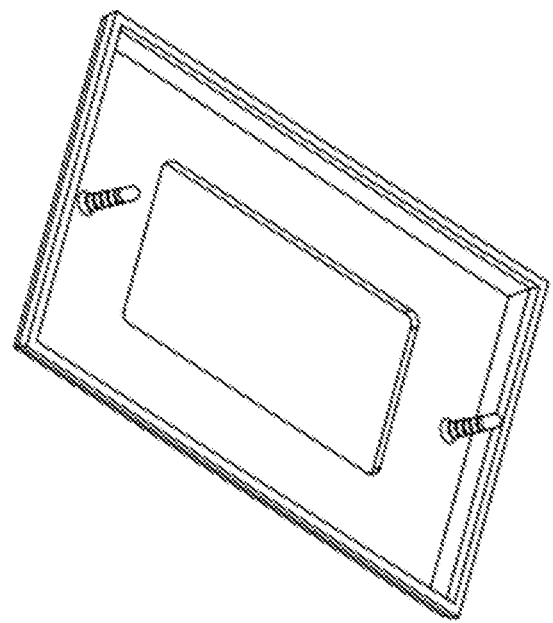
FIG. 3B is a rear-perspective view of the switch cover plate of FIG. 3A.
Figure 3C:
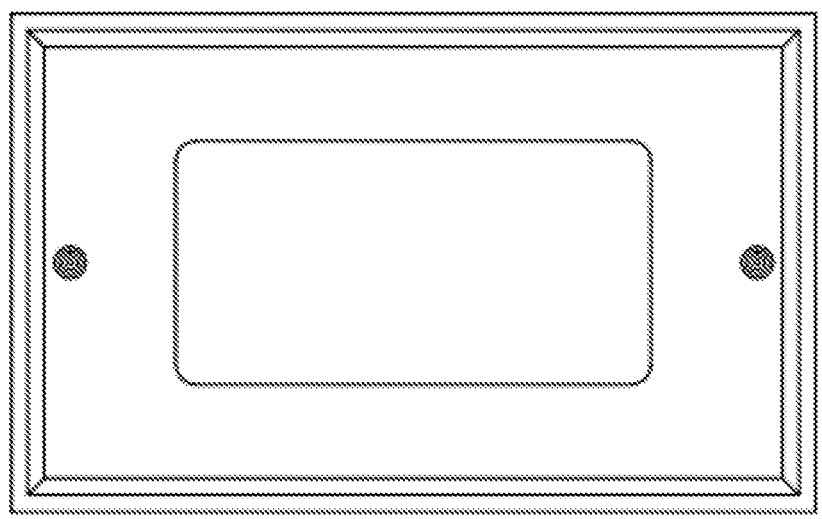
FIG. 3C is a rear-side view of the switch cover plate of FIG. 3A.
Figure 3D:
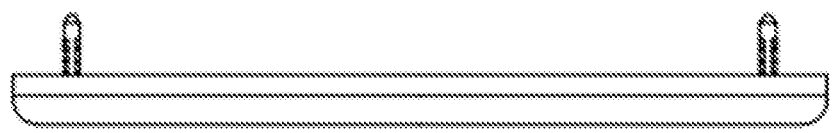
FIG. 3D is a side view of the switch cover plate of FIG. 3A.
Figure 4A:
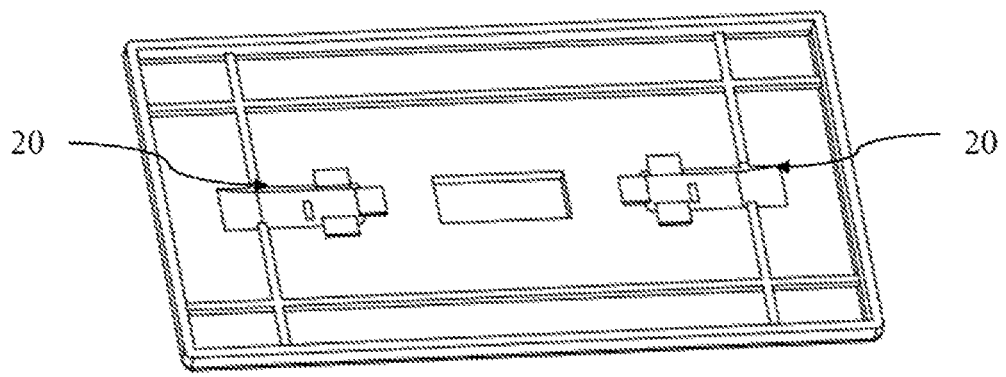
FIG. 4A illustrates another example of a switch cover plate, showing rear perspective view, with separately attachable prongs.
Figure 4B:
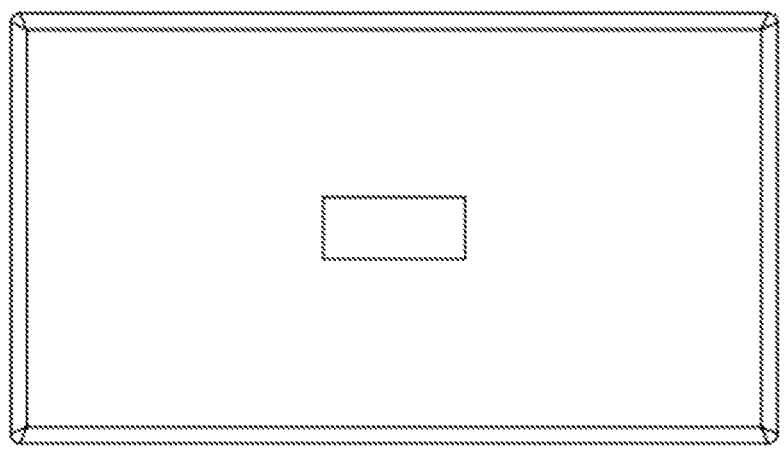
FIG. 4B is a front view of the switch cover plate of FIG. 4A.
Figure 4C:
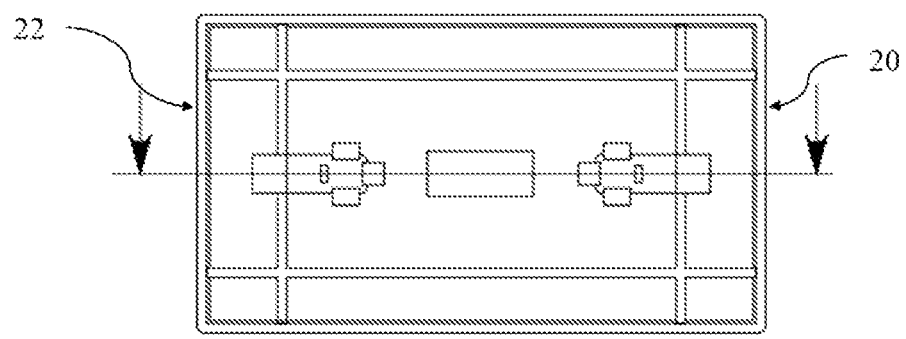
FIG. 4C is rear view of the switch cover plate of FIG. 4A.
Figure 4D:
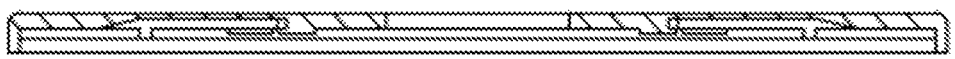
FIG. 4D is section view of the switch cover plate of FIG. 4C.
Figure 5A:
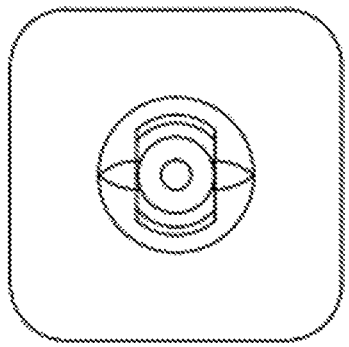
FIG. 5A illustrates a rear view of prong configured to receive the receptacles.
Figure 5B:
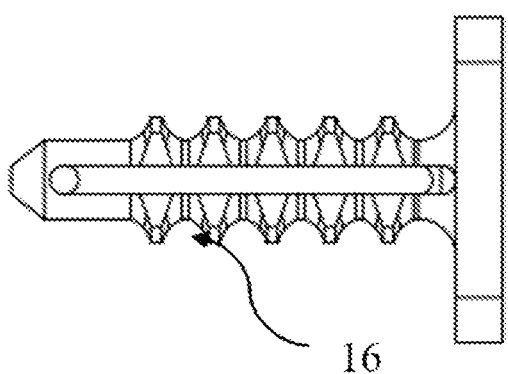
FIG. 5B is a side view of the prong, according to an embodiment of the present invention.
Figure 5C:
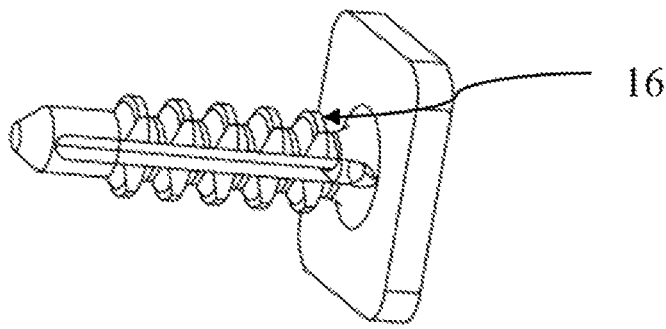
FIG. 5C is a side perspective view of the prong, according to an embodiment of the present invention.
Figure 5D:
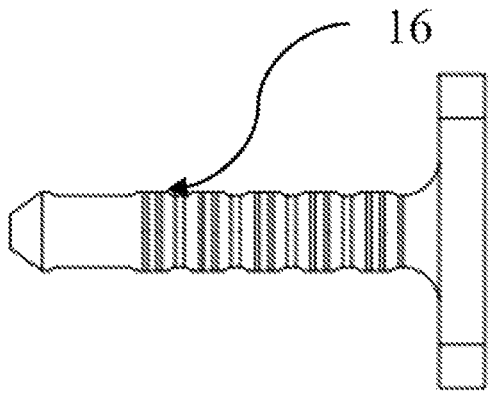
FIG. 5D is a top view of the prong, according to an embodiment of the present invention.

In FIG. 2A-2C, views of an example of a switch cover plate 10 are representatively illustrated. The switch cover plate 10 is configured to cover an electrical box 20 in which an electrical switch (such as light switch) is secured. Although an opening for only one switch is depicted in the cover plate 10, in other examples the cover plate 10 could be configured to accommodate any number of switches, outlets, data ports, etc.

In FIG. 3A-3D, views of another example of a switch cover plate 10 are representatively illustrated. This cover plate 10 is in use for the type of a switch known as a "rocker" switch 30. This demonstrates that the principles of this invention are applicable to any type of cover plate for use with any type or number of components used in conventional electrical outlet boxes (such as, data ports, television cable connectors, switches, indicator lights, electrical outlets, etc.).

In FIG. 4A-4D, views of another example of a switch cover plate 10 are representatively illustrated. In this example, the prongs are separately attachable to a rear face of the cover plate 10. The cover plate 10 has receptacles formed in the rear face to receive the prongs therein. Any type of cover plate 10 may be used with receptacles for receiving the prongs.

The prong 14 depicted in FIG. 5A-5D is similar to those described above and shown in FIGS. 1-3, but in the FIG. 5 example the prong 14 has a base that is configured to be received in the receptacles shown ion FIG. 4. When the prongs are inserted into the threaded holes 24 in the switch, outlet 22 or other electrical component, the prong 14 sections can flex towards each other. After the cover plate 10 is installed, the flexibility of the prong 14 sections helps to maintain the cover plate 10 in position on the electrical box 20.

Figure 6A:
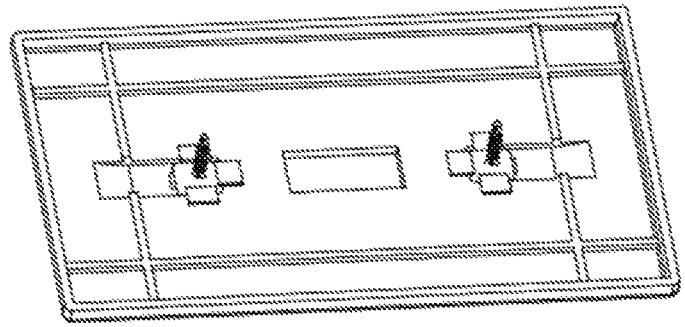
FIG. 6A illustrates a rear perspective view of the cover plate depicted in FIG. 4 with the prongs depicted in FIG. 5 to be received in the receptacles.
Figure 6B:
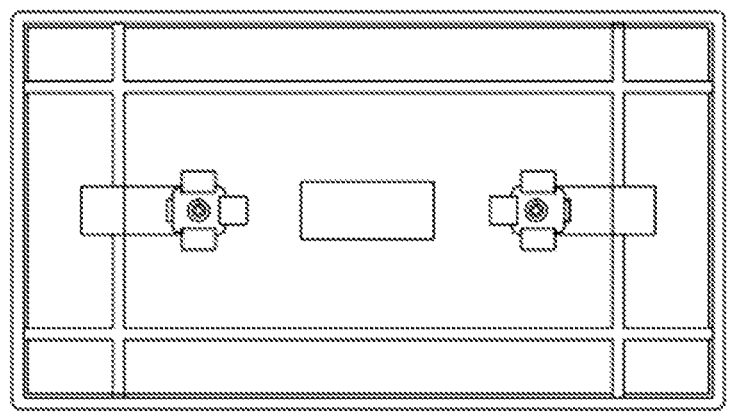
FIG. 6B is a rear side view of the cover plate of FIG. 6A.
Figure 6C:
FIG. 6C is a side view of the cover plate of FIG. 6A.
Figure 8A:
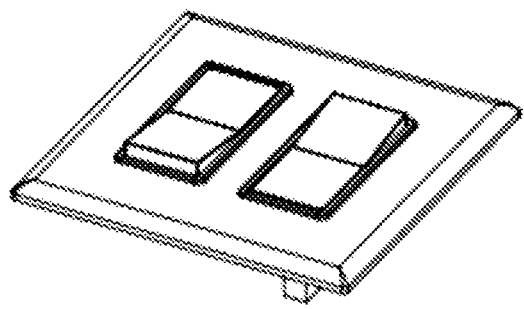
FIG. 8A illustrates the perspective front view of a rocker switch with cover plate.
Figure 8B:
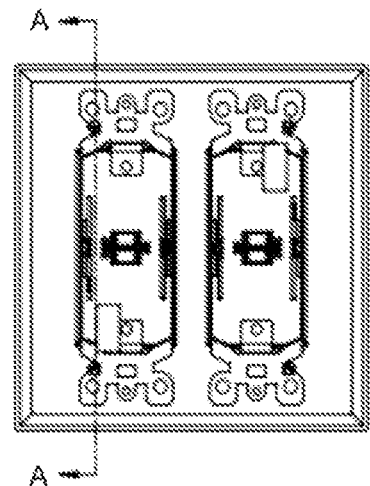
FIG. 8B is a front view of the rocker switch facilitating insertion of cover plate on itself
Figure 8C:
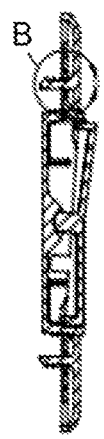
FIG. 8C is side sectional view along A-A of FIG. 8B.
Figure 8D:
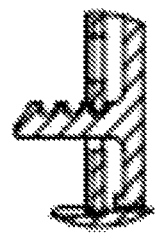
FIG. 8D is a sectional view along B of FIG. 8C.

In FIG. 6A-6C, the FIG. 4A-4D cover plate 10 is depicted with the FIG. 5A-5D prongs received in the receptacles. The cover plate 10 is now ready to be installed on the electrical outlet box 20 by inserting the prongs into the threaded holes 24 in the electrical component (switch, outlet, data port, etc.).

FIG. 7A-7D illustrates a perspective view of an electrical outlet box 20 in which the prongs 14 of the cover plate 10 needs to be inserted. The electrical outlet box 20 comprises of an electrical outlet 22. The prong 14 is positioned in such a manner that it aligns with a threaded hole 24 in the electrical outlet 22 conventionally used to receive a screw for fastening a cover plate 10 to the outlet 22.

FIG. 8A-8D illustrates the perspective front view of the rocker switch 30 facilitating insertion of cover plate 10 on itself. The cover plate 10 is in use for the type of a switch known as a "rocker" switch 30. This demonstrates that the principles of this invention are applicable to any type of cover plate for use with any type or number of components used in conventional electrical outlet boxes.

As will be apparent to one of ordinary skill in the art, after reading the disclosure contained herein, there are numerous optional configurations of the locations of the prongs 14 and the shape, size, and configuration of the prongs 14, as well as openings, which can provide further options to accommodate various devices.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A screw less cover plate for electrical fixtures comprising:
at least one prong integrally formed on a rear portion of the cover plate and adapted to couple with at least one outlet of an electrical box to secure the cover plate to the electrical box, the at least one prong comprises a body that extends from a base and that terminates in an elongated end portion, the body having a pair of sections separated by a void such that the pair of sections flex towards each other under an external force and returns to its original form when the external force is removed, the pair of sections configured as a plurality of ridges, the elongated end portion having a diameter less than that of a threaded hole such that the elongated end portion can be easily inserted into the threaded hole for positioning the cover plate and thereafter the external force can be applied to insert the body of the at least one prong into the threaded hole;
wherein the cover plate does not require a screw to attach the cover plate to the electrical box; and
wherein the cover plate does not require modification of the electrical box in order to be received and attached to the electrical box.

2. The screw less cover plate of claim 1, wherein the at least one prong having the pair of sections that expands back against walls of the threaded hole in the at least one outlet of the electrical box to secure itself firmly in place.

3. The screw less cover plate of claim 1, wherein the plurality of ridges are longitudinally distributed.

4. The screw less cover plate of claim 1, wherein the at least one prong extends rearward from a rear face of the cover plate.

5. The screw less cover plate of claim 1, wherein the at least one prong is tapered from the elongated end portion towards the cover plate.

6. The screw less cover plate of claim 1, wherein the pair of sections of the at least one prong flex towards each other when the prong is inserted into the threaded hole in the electrical outlet secured in the electrical box.

\* \* \* \* \*